United States Patent [19]
Savage

[11] 4,215,890
[45] Aug. 5, 1980

[54] LENS HOLDER
[76] Inventor: Milton Savage, 500 Fifth Ave., New York, N.Y. 10036
[21] Appl. No.: 967,124
[22] Filed: Dec. 7, 1978
[51] Int. Cl.³ .................................................. G02B 7/02
[52] U.S. Cl. .................................... 294/31.2; 350/256
[58] Field of Search .................. 294/6, 27 R, 31.2, 33, 294/99 R; 16/114 R; 24/256, 260; 350/245, 246, 251, 256

[56] References Cited
U.S. PATENT DOCUMENTS

| | | | |
|---|---|---|---|
| 681,283 | 8/1901 | Waynick | 294/31.2 X |
| 718,748 | 1/1903 | Boehm | 350/244 |
| 1,221,794 | 4/1917 | Day | 350/256 |
| 1,483,745 | 2/1924 | Propson | 350/256 |
| 2,268,430 | 12/1941 | Silbernagel | 350/256 |
| 2,322,441 | 6/1943 | Holliday | 350/256 |
| 2,634,153 | 4/1953 | Milligan | 294/31.2 |

FOREIGN PATENT DOCUMENTS
2347861  12/1977  France .................................. 350/256

*Primary Examiner*—Johnny D. Cherry

[57] ABSTRACT

This is a holder for glass or plastic lenses of varying sizes and shapes used to facilitate their handling. A lens is removably held within a flexible loop with an inner groove which receives the edge of the lens. The ends of the loop are fastened to each other and encased in a tubular handle which serves as a means for handling the lens readily without damaging it. A sliding sleeve enables one to lock a lens into the holder or remove it easily when necessary.

2 Claims, 6 Drawing Figures

LENS HOLDER

BACKGROUND OF THE INVENTION

Optometrists, oculists, ophthamologists, and others who fit glasses for their patients often find it necessary to let them handle individual lenses. If a patient wishes to look through a lens to examine its color, for example, he must hold it up to his eye. When he does this, there is always the danger that he will drop, scratch, or dirty the lens.

Lenses are often provided with individual holders to avoid these dangers. Since lenses now come in so many shapes and sizes, a wide variety of holders must be made to accommodate the variations. In addition, most of the holders used today must be heated before the lenses can be snapped into place. The same heating step is needed for removal. As a result, they are frequently hard to secure to and remove from a lens.

The present invention, accordingly, seeks to overcome these difficulties by providing an adjustable holder which can removably hold a variety of lenses. The lens can be readily locked into the frame and removed from it. The holder has a handle for the patient to grasp so that he does not have to handle a lens by its edges.

Another feature of the present invention is that it can receive both circularly and noncircularly shaped lenses. This holder can accommodate both plastic and glass lenses. The lenses may also vary substantially in thickness at their edges and still fit the lens holder.

SUMMARY OF THE INVENTION

An adjustable lens holder is provided with a flexible loop having an inner groove to receive the periphery of a lens. The free ends of the loop are bent together to form a shank, the end of which is held within a tubular handle. A tightening sleeve, frictionally received upon the shank between the loop and handle, serves to removably secure the lens within the inner groove.

DESCRIPTION OF THE DRAWING

In the accompanying drawing forming a part hereof, similar parts have been given identical reference numbers, in which drawing

DESCRIPTION OF THE PREFERRED EMBODIMENT

Figure 1:
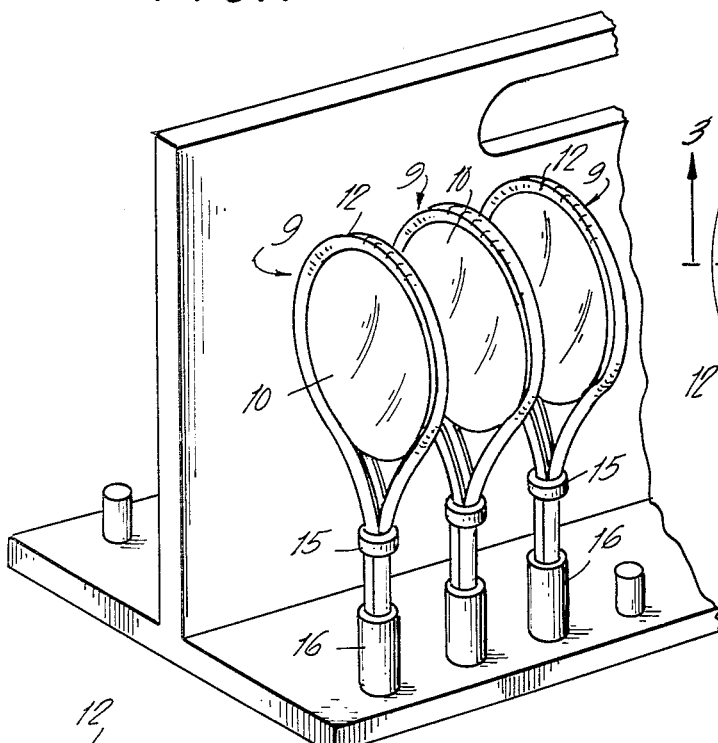
FIG. 1 is a somewhat isometric fragmentary view of several lens holders made in accordance with the present invention held in a tray.
Figure 2:
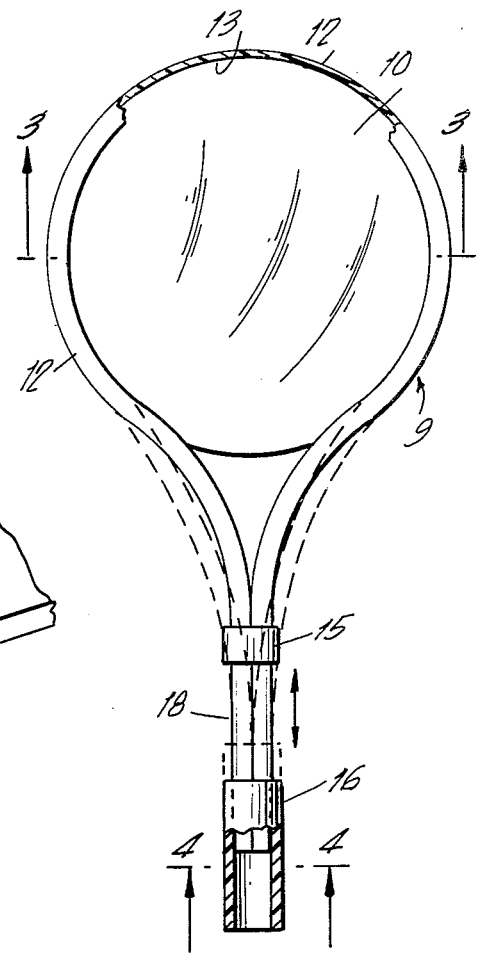
FIG. 2 is a view in elevation of a complete embodiment of the present invention partially broken away.
Figure 3:
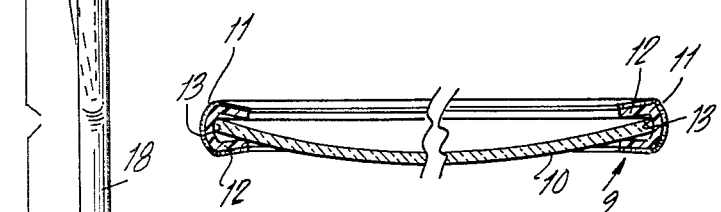
FIG. 3 is a cross-sectional view of the lens holder taken on the line 3—3 in FIG. 2 looking in the direction of the arrows.
Figure 5:
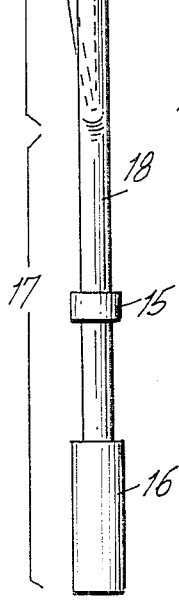
FIG. 5 is a side view, partly in section, of the present invention.
Figure 6:
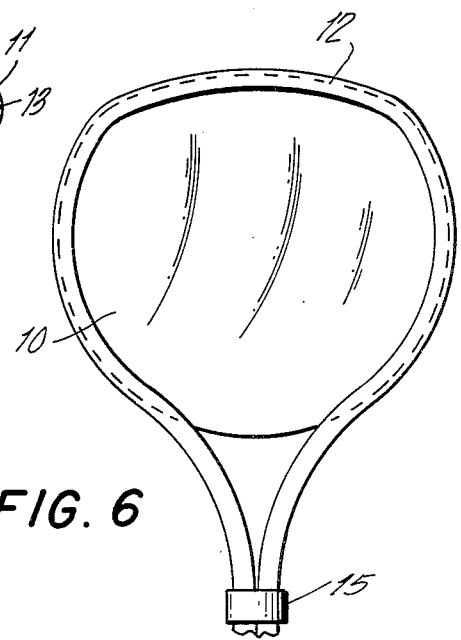
FIG. 6 is an elevational fragmentary view of the top portion of the invention, showing how the loop can accommodate a noncircular lens.

Referring to the drawing and to FIGS. 2, 3 and 5 in particular, 9 indicates an adjustable lens holder made in accordance with the present invention. Holder 9 consists of a top portion 14, and a lower portion 17 having a handle 16 and a shank 18. A tightening sleeve 15 is slideably mounted on said shank. As FIG. 1 shows, a plurality of these holders may be readily held in a tray.

A lens 10 is removably held by its edges within a flexible loop-shaped frame 12 having an elongated groove 13 wide enough to receive said edges. Frame 12 can be formed out of any flexible plastic such as cellulose acetate butyrate, nylon, or the like. For purely aesthetic reasons, frame 12 can be coated with a chromium or other metalic coating 11. Since frame 12 is flexible, it can receive both circular and non-circular lenses of both glass and plastic. In addition, the lenses may be of differing thicknesses. The difference in shapes and sizes of the lenses is compensated for by slidably tightening sleeve 15 upon the shank 18 to pull the loop tightly about the lens once it has been inserted within the groove.

Figure 4:
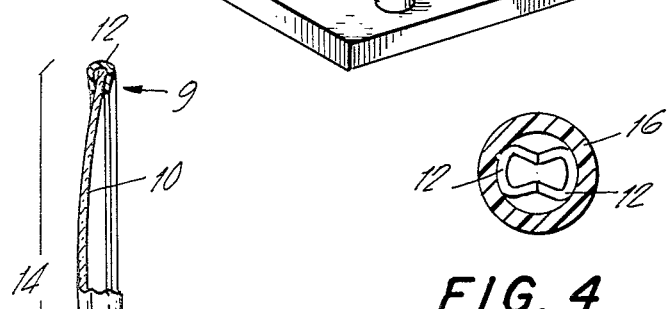
FIG. 4 is a cross-sectional view of the lens holder taken on the line 4—4 in FIG. 2 looking in the direction of the arrows, showing how the ends of the loop are received in the handle of the holder.

The lower portion of the holder 17 consists of the two ends of frame 12 held against each other by a hollow, encircling cylindrical handle 16. Said handle is readily fashioned out of resilient plastic. Handle 16 frictionally secures the two ends of the frame together. (See FIG. 4). In addition, handle 16 provides a means with which a technician or patient can hold a lens 10 while looking through it.

Shank 18 is formed of the frame material between the loop and the handle 16. A tightening sleeve 15, which may be made of the same plastic as the handle, is slidably mounted upon the shank 18. Sliding sleeve 15 toward the top of the holder closes the frame loop so that its inner groove 13 encloses the edges of lens 10. The tightening sleeve 15 can be pushed far enough toward the top of the holder 9 to frictionally lock itself beneath the loop shaped frame 12, thereby securing the lens within the frame 12. The sleeve 15 will lock in different positions, depending upon the shape and circumference of the lens inserted in the holder 9.

To remove lens 10, one need only pull tightening sleeve 15 downward toward handle 16. Frame 12 will then expand and release lens 10 so that it can be removed from the holder.

Having thus fully described the invention, what is desired to be claimed and protected by Letters Patent is:

1. An adjustable lens holder comprising a flexible loop shaped frame, formed of a continous strip of material, free end portions on said frame forming a straight shank, an elongated groove within said looped frame to receive a lens, a tubular handle to receive the free ends of said loop shaped frame, and a tightening sleeve slidably mounted on said frame shank above said handle to lock a lens within the elongated groove.

2. An adjustable lens holder according to claim 1 in which the flexible loop shaped frame is made of cellulose acetate butyrate.

* * * * *